United States Patent [19]

Gordon

[11] 4,445,160

[45] Apr. 24, 1984

[54] FAULT-POWERED LOW-LEVEL VOLTAGE CLAMP CIRCUIT

[75] Inventor: John T. Gordon, Ambridge, Pa.

[73] Assignee: Westinghouse Electric Corp., Pittsburgh, Pa.

[21] Appl. No.: 363,758

[22] Filed: Mar. 30, 1982

[51] Int. Cl.$^3$ .............................................. H02H 9/04

[52] U.S. Cl. ....................................... 361/91; 323/226

[58] Field of Search ..................... 361/56, 91; 323/223, 323/226, 231

[56] References Cited

U.S. PATENT DOCUMENTS 4,095,164 6/1978 Ahmed ............................... 323/226
4,334,256 6/1982 Mings .............................. 361/91 X

FOREIGN PATENT DOCUMENTS 2263541 7/1974 Fed. Rep. of Germany ........ 361/56
1110123 4/1968 United Kingdom ................ 323/223

OTHER PUBLICATIONS

IBM Tech. Disc. Bulletin vol. 11, No. 2, 7/68 "Over Voltage Protection Circuit"-Lorenz Shunt Stabilized Power Supply-Suter Wireless World 3/76 p. 90.

*Primary Examiner*—Harry E. Moose, Jr.
*Attorney, Agent, or Firm*—T. R. Trempus

[57] ABSTRACT

A low-level voltage clamp circuit drives its active components with the fault voltage of a main circuit being protected which main circuit operates at about one volt DC or less. The clamping circuit senses voltages in excess of a predetermined limit and effects the sinking of increasing levels of fault current in order to hold the voltage of the main circuit at the predetermined clamp limit.

5 Claims, 3 Drawing Figures

FAULT-POWERED LOW-LEVEL VOLTAGE CLAMP CIRCUIT

BACKGROUND OF THE INVENTION

1. Field of the Invention

The invention is directed to a low-level voltage clamping circuit. More particularly, the low-level voltage clamping circuit of this invention does not require its own separate power supply, but rather drives its active components from the fault voltage of the circuit being protected.

2. Description of the Prior Art:

Certain electrochemical processes require low level excitation voltages in order to function. By low level voltages, what is meant is about one volt or less. In these electrochemical processes, if for any reason the low-level voltages were to experience even a partial increase above the normal excitation range, chemically irreversible process reactions might begin to occur. Accordingly, a protective low-level voltage clamp is required to limit the maximum applied excitation voltage to an acceptable level. Furthermore, such a protective clamp must function under all circumstances, whether the conditions are normal or fault.

It has been suggested that operational amplifier clamping circuits be employed because at or about 1.0 volt DC, such clamping circuits are very effective. Excellent off-on characteristics as well as sharp switching at the pre-set clamping level are exhibited. However, if the dual differential power supply of the operational amplifier fails, the clamp is lost. Moreover, if only one side of the dual differential power supply fails, not only is accurate clamping lost, but the clamping circuit itself may now act as a source of voltage well in excess of the required clamping level. While operational amplifiers that can operate from a single-sided power supply at as low as 1.0 volt DC are available, if the power supply fails, the clamp is lost. Furthermore, even though single-sided operational amplifiers can be incorporated into a two-terminal protective network powered only by the two terminals at which clamping must be effected, the voltage normally available to power the protective network is lower than the minimum voltage required to power such an operational amplifier. As a result, the operational amplifier may actually act as a source or sink for the excitation voltage to the electrochemical process rather than acting as a high off impedance network.

It is also known to use two-terminal clamping devices such as Zener diodes or integrated circuit reference diodes. The diodes offer a relatively high off impedance below their breakover voltage and they do not require a power supply in order to clamp voltages. There are, however, critical deficiencies in such devices relative to the application of the clamping circuit of this invention. The aforementioned Zener diodes and reference diodes either are not available in the low voltage range of interest, do not provide sharp switching knees or cannot sink high levels of fault current.

It is, therefore, an object of this invention to provide a circuit design for a low-level voltage clamp that drives its active components from the fault voltage of the protected circuit.

It is also an object of this invention to provide a low-level voltage clamping circuit which can operate in a range from its clamping level at one end down to zero volts at the other.

It is a further object of this invention to utilize within the circuit, functional blocks comprised of discrete semiconductor components which enable the invention to operate in the range of between 1.0 to 0 volts DC.

It is still an object of the invention to circumvent power limitations on the amount of fault current the clamp can handle by employing an intermediate amplifier stage and current sinking output stage.

SUMMARY OF THE INVENTION

A fault-powered low-level voltage clamp provides protective, low-level clamping action across the terminals of a circuit when the voltage of this circuit exceeds a predetermined limit. The voltage clamp includes a low power reference means which is sensitive to voltages in excess of the predetermined limit. The reference means has a first state in which the circuit voltage is below the predetermined limit and a second state when the circuit voltage exceeds this limit. A comparator means is responsive to the reference means and generates an output signal when the circuit voltage exceeds the predetermined limit as indicated by the reference means. An amplifier means is responsive to the comparator means, increasing the marginal output thereof by a predetermined amount of gain. A current sinking means is responsive to the amplified comparator output and effects the clamping of the circuit voltage across the terminals of the protected circuit.

The low-level voltage clamp design of this invention does not require any separate power supply for its active semiconductor components because the voltage clamp receives its control voltage from the fault voltage of the circuit across which it is placed to provide clamping action. In its off state, the instant clamp acts as a very high impedance across the aforesaid terminals and is independent of any other electronic circuit of electrochemical process acting on these terminals. When the voltage at which clamping is to occur is sensed, the clamp, following a very sharp switching curve, changes from the off-state to the on-state. The sharpness of the switching curve can be varied by controlling the gain of the amplifier. As the voltage across the main circuit terminals attempts to rise, the clamping circuit successively sinks increasing levels of fault current and holds the voltage across the terminals to the predetermined level.

BRIEF DESCRIPTION OF THE DRAWINGS

The above as well as other features and advantages of this invention will become apparent through consideration of the detailed description in connection with the accompanying drawings in which.

DESCRIPTION OF THE PREFERRED EMBODIMENT

Figure 1:
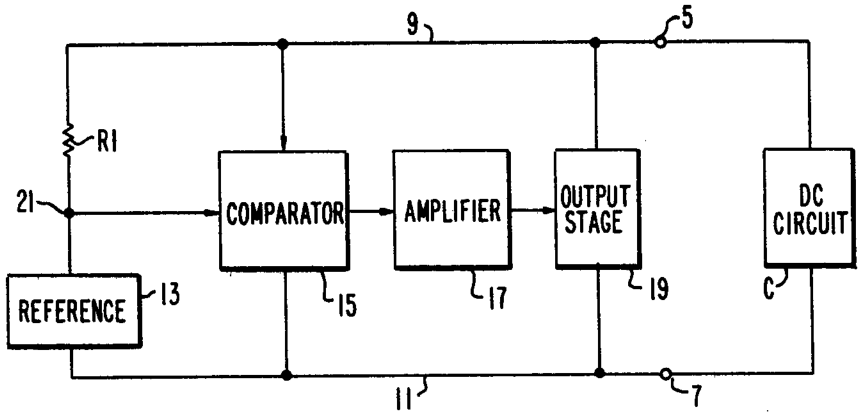
FIG. 1 is a block diagram of a low-level clamping circuit according to this invention.

The block diagram of FIG. 1 illustrates the fault-powered low-level voltage clamp circuit of this invention associated with the two terminals 5 and 7 which are associated with the main DC circuit 'C' which is to be voltage-level protected. Electrical conductors 9 and 11 provide a source of power to the control circuitry consisting of a low power reference device 13 such as a zener diode, a resistor R1, a comparator 15, an amplifier 17 and output stage 19 which is a current sinking amplifier. The low power reference device 13 forms one input to the comparator 15 which is comprised of discrete electronic devices, as will be hereinafter explained, in order to operate at a low-level voltage in the range of about 1 volt DC or less. The comparator 15 is referenced to one of the two terminals 5 and 7 that are to be voltage-level protected. The other input to the comparator 15 is the second terminal of the aforesaid terminals 5 and 7. As the voltage across the electrical conductors 9 and 11 increases, the voltage at the junction 21 of resistor R1 and the reference device 13 also increases until it reaches the breakover voltage of the low power reference device 13. Resistor R1 provides a low resistance of about 100 ohms and, therefore, the voltage at the junction 21 is virtually the voltage at the conductor 9 until the reference breakover voltage is obtained. When reference breakover voltage is reached, the voltage at junction 21 ceases to rise along its previous slope. The conductor voltage, however, attempts to continue at the same rate of increase. The potential difference is immediately sensed by the discrete component comparator 15 which then begins to change from a low to a high state. The amplifier 17 receives the relatively slowly changing comparator output signal and increases the signal level by a preselected amount of gain. The output signal of amplifier 17 turns on the final output stage 19 which then sinks current from the terminal 5 to the terminal 7 with the result that the impedance of the overall protection circuit is greatly lowered. As the fault voltage across the terminals 5 and 7 attempts to rise further, the effective impedance of the clamp successively decreases. Through this action, the clamp holds the voltage across the two terminals 5 and 7 to a level which virtually equals the breakover voltage of the lower power referece device 13. Once the fault voltage across the two conductors 9 and 11 clears, the clamp again returns to a high impedance off state in which it does not interact with any other voltages or currents occurring at the two terminals 5 and 7 of the circuit 'C' which the clamp is protecting.

The amount of fault current which the clamp can sink is determined by the power rating built into the output stage 19 and the amount of gain provided by the amplifier 17. The amount of gain in the amplifier 17 determines the shape of the switching curve from the on to the off state of the output stage 19 since both the sharpness and flatness of the switching curve vary in proportion therewith.

Figure 2:
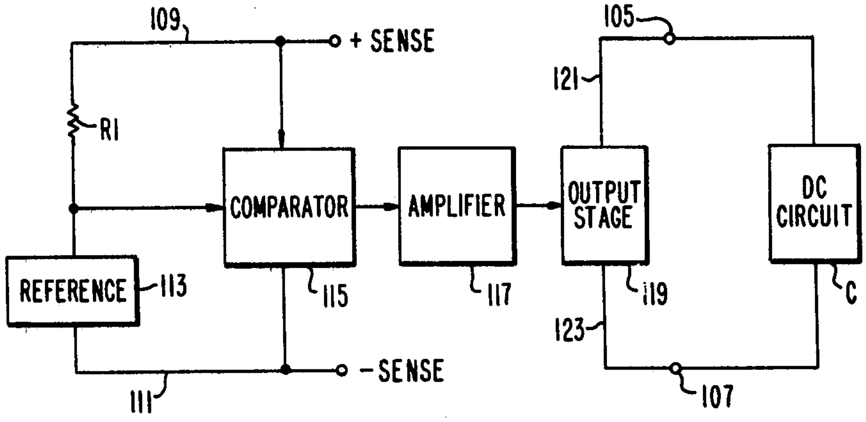
FIG. 2 is a block diagram of an alternative configuration of a low-level clamping circuit according to this invention which can be used when remote sensing is required.

Turning now to the block diagram of FIG. 2, an alternative configuration of the fault-powered low-level voltage clamp of this invention is shown which permits remote sensing. This embodiment is preferred if too large of an iR drop, relative to the clamping voltage, occurs across the output stage when sinking fault current. That is to say, for example, that if the iR drop is in excess of 3% of the clamped voltage, it can be advantageous to separate the sensing and current sinking functions. While a 3% guideline is typical, the actual iR drop which can be tolerated is a function of component values. It can be readily observed that the comparator 116 is referenced to a sense lead 109 which is also a source of power to the low-power reference device 113.

The two leads 109 and 111 of the alternative configuration funcion in the same manner as the conductors 9 and 11 of the embodiment illustrated in FIG. 1. The sensing leads 109 and 111 are in communication with the protected terminals 105 and 107 and a pair of sinking leads 121 and 123 are in electrical contact with terminals 105 and 107.

As was the case with the embodiment described in connection with FIG. 1, the alternative embodiment of FIG. 2 relies on the breakdown voltage of the low-power reference device 113 being reached and the resulting change of the discrete component comparator 115 from a low to a high state. However, the iR drop occurring across the output stage 119 will not present an erroneously lower voltage at the sensing leads 109 and 111.

Figure 3:
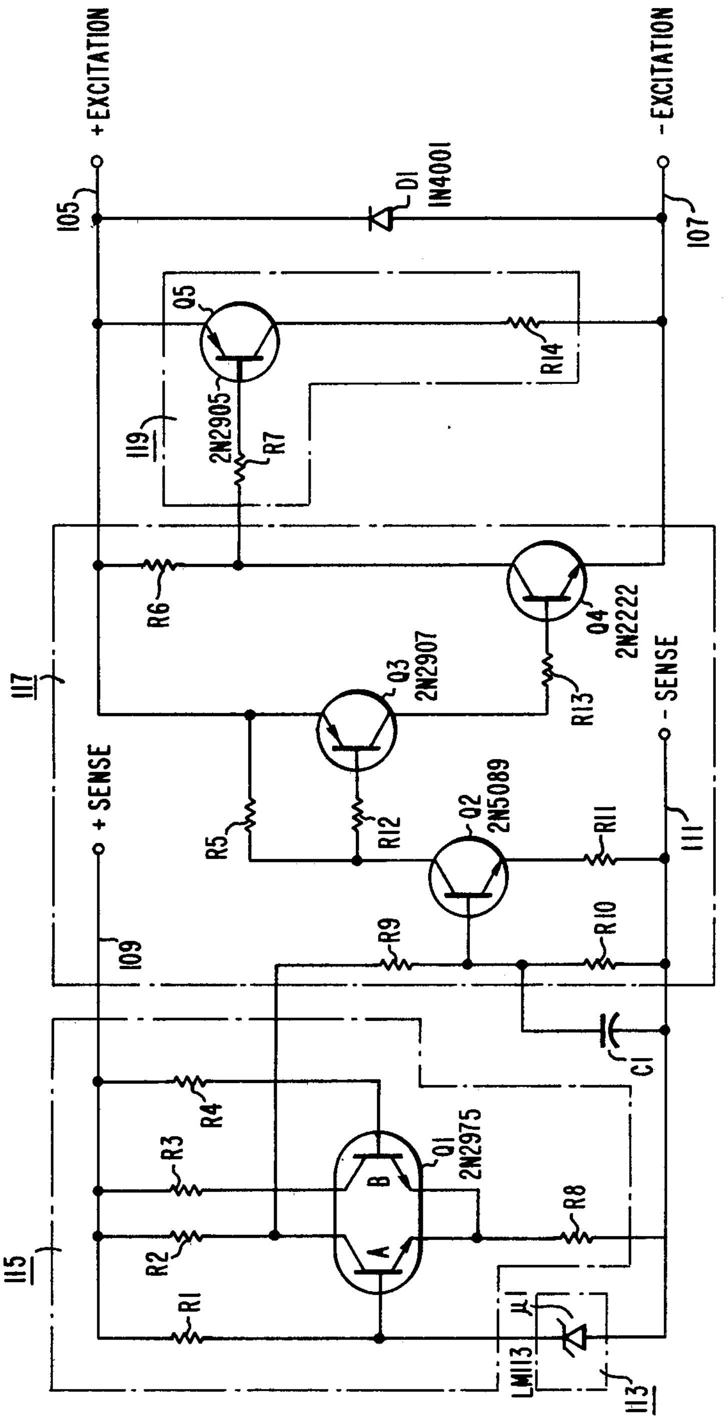
FIG. 3 is a schematic of the alternative configuration shown in block diagram in FIG. 2.

In FIG. 3 a detailed schematic of the alternative embodiment of the fault-powered low-level voltage clamp of this invention is provided. This embodiment of the invention clamps at 1.22 volts DC and is capable of sinking 400 milliamps. The values of the various components associated with the instant invention can, of course, be modified to meet various applications and requirements without departing from the spirit and scope of the invention.

The low-power reference device 113 consists of zener diode U1 which has a reference breakover voltage of 1.2220 volts. The discrete component 115 is comprised of resistors R1, R2, R3, R4, R8 and transistor Q1. The intermediate amplifier 117 consists of resistors R9, R10, transistors Q2, Q3, Q4, and the associated biasing resistors R5 and R6. The output stage 119 comprises resistors R7, R14 and transistor Q5. The capacitor C1 provides stability for the overall regulator loop due to the amount of gain in the amplifier 117. The diode D1 functions as a gross clamping device in the reverse direction should the terminals 105 and 107 experience polarity reversal under fault conditions. It is, of course, possible to provide a second fault-powered low-level voltage clamp according to this invention as a clamp in the reverse direction.

The center of the comparator is the dual-matched differential transistor pair Q1. Below the clamping level, current from conductor 109 flows through resistors R1 and R4 into transistors Q1-A and Q1-B, respectively, and then in combination through resistor R8. The differential pair of Q1-A and Q1-B are thus both turned on. The voltage present as an input to resistor R9 is, therefore, substantially that level determined by the voltage divider of resistor R8 in series with the parallel combination of resistors R2 and R3 acting on the available voltage across the conductors 109 and 111. This divider is set such that below the clamping level, the input voltage to resistor R9 will not cross the lower threshold of the amplifier stage and thereby the clamp remains turned off. Once the voltage reaches the critical level where clamping must occur, zener diode U1 breaks over and begins to admit current. This action shunts current from transistor Q1-A. Transistor Q1-B then works into a lower voltage at resistor R8 and thus turns on more. This causes the voltage of resistor R8 to rise which in turn causes transistor Q1-A to turn off. The voltage at resistor R9 then starts to rise toward the voltage of conductor 109. The voltage at resistor R9 is amplified and the final output stage turned on. As explained, this action will sink current and thereby clamp the voltage to a level determined by the low-power reference device 113.

What has been described is a fault-powered low-level voltage protection circuit which clamps voltage levels of about 1 volt DC and lower; presents a high impedance in its off state to the pair of terminals being voltage-level protected; and maintains its high off-state impedance at any voltage in the range from clamping level voltage down to zero volts. Moreover, the instant protection circuit does not require a separate power supply nor is it inherently power limited in the amount of fault current it can sink.

What is claimed is:

1. A low-level voltage clamp circuit which provides protective, low-level clamping action across a first and a second terminal of a main DC circuit when the voltage of said DC circuit exceeds a predetermined limit indicating a fault condition, comprising:

a reference means operatively connected to said main DC circuit and sensitive to voltages in excess of said predetermined limit, said reference means having a first state when said circuit voltage is below said predetermined limit and a second state when said circuit voltage exceeds said predetermined limit;

a comparator means responsive to said reference means and generating a changing output signal when said reference means is in said second state, said changing output signal reflecting the amount of voltage exceeding said predetermined limit;

an amplifier means responsive to said comparator means output signal and increasing said comparator output signal by a predetermined amount of gain; and an output stage means responsive to said amplified comparator means output for effecting the clamping of the main circuit voltage to said predetermined level; wherein said low-level voltage clamp utilizes said main DC circuit voltage as a source of control voltage for its components when clamping is being effected and wherein the voltage across said first and second terminals of said main DC circuit remains present throughout the clamping action at a level no greater than said predetermined limit.

2. The low-level voltage clamp circuit of claim 1 wherein the reference means is in contact with the main DC circuit at the first and second terminals thereof.

3. The voltage clamp circuit of claims 1 or 2 wherein the predetermined voltage limit is about 1 volt DC or less and wherein said voltage circuit is in a state of high output impedance when the main DC circuit is operating below said predetermined limit and in a state of low impedance during clamping.

4. The voltage clamp circuit of claims 1 or 2 wherein the amplifier means includes means to determine and control a voltage clamp circuit switching curve from the high impedance state to the low impedance state.

5. The voltage clamp circuit of claims 1 or 2 including means to provide gross clamping in the reverse direction should fault condition effect a polarity reversal of the main DC circuit voltage.

* * * * *